United States Patent Office 2,740,797
Patented Apr. 3, 1956

2,740,797
STEROIDS

Gerald D. Laubach, Jackson Heights, and Eric C. Schreiber, Hicksville, N. Y., assignors to Chas. Pfizer & Co., Inc., Brooklyn, N. Y., a corporation of Delaware No Drawing. Application October 29, 1952,
Serial No. 317,576

5 Claims. (Cl. 260—397.2)

This invention is concerned with a process for the selective reduction of double bonds in certain steroid compounds. In particular, it is concerned with the selective reduction of the 14,15-double bond of certain nuclear poly-unsaturated 11-keto steroid compounds.

In the preparation of certain biologically active steroid compounds, such as cortisone and Compound F, oxygen must be introduced at the 11-position of steroid nuclei not containing such a substituent and the steroid nucleus must be saturated except for a single double bond at the 4,5-position of the nucleus. In the preparation of cortisone and related compounds from readily available intermediates, the introduction of oxygen at the 11-position is often accompanied by the introduction of unsaturation at various positions of the steroid nucleus. Furthermore, certain of the widely available steroid starting materials have alkenyl side chains bearing a double bond at the 22,23-position. It is highly desirable that methods be made available for the selective saturation of certain of the nuclear double bonds of intermediates prepared from these readily available steroid starting materials, without the simultaneous saturation of the double bond in the side chain.

The double bond in the side chain at the 17-position serves as a convenient point of cleavage of this side chain to shorter chains which are more readily convertible to the short oxygenated side chains common to certain of the biologically active steroid compounds.

It is an object of this invention to provide a method for the selective reduction of the 14,15-double bond of certain nuclear unsaturated steroid compounds. A particular object is the reduction of this double bond in nuclear poly-unsaturated 11-keto steroid compounds having an unsaturated side chain at the 17-position of the steroid compound. It is a further object of this invention to provide a method for the preparation of steroid intermediates highly useful in the synthesis of biologically active steroid compounds. Other objects will become apparent below.

In a prior copending patent application Serial No. 293,426, filed on June 13, 1952, by Gerald D. Laubach et al., now abandoned, and in a continuation-in-part of said application (Serial No. 368,199, filed July 15, 1953) there is described a procedure for the reduction of the 14,15-double bond of certain nuclear poly-unsaturated 11-keto steroid compounds bearing a side chain at the 17-position with a double bond between the 22 and 23 carbon atoms. Methods for the preparation of the initial 11-keto, 14-unsaturated steroid reactants are also shown in these same applications. It was pointed out that the reaction, although effective in reducing nuclear double bonds other than that at the 8,9-position, also reduces the 22,23-double bond of the side chain. Since the retention of the 22,23-double bond in unreduced condition has some definite advantages in that it permits the ready removal of a major part of the side chain in a later stage of the cortisone synthesis, the method disclosed in the above cited patent application has certain disadvantages. It has now been found that under certain specific conditions it is possible to reduce 14,15-unsaturated 11-keto steroid compounds bearing a double bond in the side chain attached to the 17-position in a selective manner to the corresponding 14,15-saturated steriod compound with retention of the double bond in the side chain. This selective, highly useful reaction is accomplished by contacting the steroid starting materials with hydrogen in the presence of a highly active Raney nickel catalyst known as W-7 Raney nickel and in the presence of a minor proportion of an alkaline material. The W-7 Raney nickel catalyst may be prepared by a procedure described by Adkins and Billica in the Journal of the American Chemical Society, vol. 70, p. 698 (1948). The reaction is normally conducted in a suitable polar organic solvent.

In general, the process of this invention is best utilized for the selective reduction of the 14,15-double bond of a steroid compound having an unsaturated side chain. It is particularly useful for the selective reduction of the 14,15-double bond of certain derivatives of ergosterol in which the nucleus is substituted with an 11-keto group in addition to an alkenyl side chain at the 17-position. This reaction may be ilustrated by the following formulas.

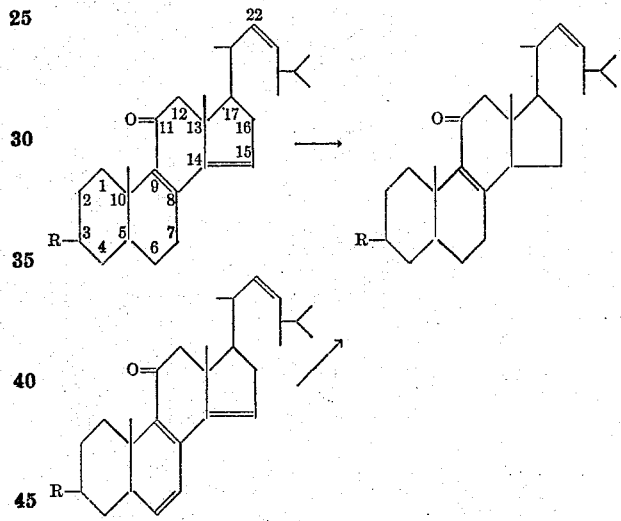

The R in the 3-position is hydroxyl or a group readily hydrolyzable to an hydroxyl, such as ethers, e. g. methyl, ethyl, benzyl, etc. or esters, e. g. acetate, benzoate, propionate, succinate, etc. The rate of reduction of the double bond in the alkenyl side chain and of the 8,9-double bond and the 11-keto group is extremely slow or is non-existent so that the reaction either stops or may be stopped when the reduction of the 14,15-double bond is practically complete. A good yield of the desired compound is then obtained. If a double bond is present at the 6,7-position of the nucleus or at positions other than the 8,9-position, the conditions of the process of this invention are such that the double bond is generally reduced at a rate comparable to that of the 14,15-double bond. However, this is not a drawback since the elimination of such double bond is often desirable in the preparation of biologically active steroid compounds.

The reduction with which this invention is concerned is generally conducted with an organic solvent solution of the steroid compound. A variety of solvents are useful for this purpose. It is relatively easy to choose a solvent which is suitable for use in this process. The solvent, of course, must not be destructive of either the steroid starting material or the steroid product. It must not cause rearrangement of the molecules. A variety of organic solvents are particularly useful for this purpose.

These include alcohols, such as methanol, ethanol, isopropanol and ethers, such as diethyl ether or dioxane. The solvent must be such that it does not combine with the alkaline agent and prevent its effect upon the specificity of the reduction.

The catalyst used in the process of this invention is as indicated above a specially prepared form of Raney nickel which is highly active in hydrogenation reactions. In general, a weight of catalyst of from about 5% to about 100% by weight of the steroid starting material is used. The use of smaller amounts may appreciably extend the time required for the reaction and the use of larger amounts has no great advantage. The alkaline agent used in the present process is any alkaline material having an ionization constant of greater than about $10^{-12}$. Of particular value are the alkali metal hydroxides, such as sodium hydroxide, potassium hydroxide, lithium hydroxide, etc. These materials possess appreciable solubility in many organic solvents. It is, of course, essential that at least a small amount of the alkaline compound used be dissolved in the reaction medium. A proportion of the alkaline material of from about 2% to about 100% by weight of the steroid compound is used. A smaller amount may generally be used effectively. Larger amounts are not necessary and are wasteful.

The reaction of this invention may be conducted at a temperature of from about 20° to about 50° C., and room conditions are normally sufficient. Lower temperatures may be utilized but there is little reason to do so. Higher temperatures may induce some decomposition of the reaction starting material or product. The reaction is generally conducted under a hydrogen pressure of at least about one atmosphere. Somewhat higher or lower pressures are also useful. The higher pressures may slightly increase the rate of reaction, but they are not essential for the completion of the reaction and the preparation of a good yield of the hydrogenated product. A concentration of from about 1% to about 10% by weight of the steroid starting material in the chosen solvent is suitable, for conducting the present reaction. Lower concentrations may be used, but there is little point to this. Higher concentrations may also be used.

The utility of the present process is considerable. Various other catalysts have been tested in an attempt to carry out the selective reduction that was made possible by the use of the combination of W-7 Raney nickel and an alkaline material. The reaction is particularly remarkable in that it gives rise to the natural epimer at the 14 carbon atom, despite the fact that strong bases are known to convert one of the starting materials which may be used for this reaction to the undesired epimer on heating. Furthermore, by application of the present process to the ergosterol derivatives as described in the examples below, it is possible to obtain ergosta-8,22-diene-11-one-3β-ol or its 3-esters, which are known intermediates for the synthesis of cortisone. Details of the method of synthesizing the biologically active product from such an intermediate are given in a paper by E. Schoenewaldt et al., Journal of the American Chemical Society, vol. 74, p. 2696 (1952).

The products of the reduction reaction may be recovered with ease. In general, the catalyst is first removed by filtration or by centrifugation and the alkaline material is neutralized. Various acids such as hydrochloric acid, sulfuric acid, acetic acid, and so forth, may be used for this purpose. The solvent is then removed and the desired product may be extracted into a solvent in which the salts resulting from neutralization of the basic material have a limited solubility. Concentration of the solvent solution of the product generally yields the crystalline product. If necessary, this product may be more highly purified by application of known methods such as recrystallization from suitable solvents or by purification, by chromatography over adsorbent materials such as alumina. In general, high yields of the desired hydrogenation products are obtained. If a 3-ester of the steroid is used as starting material, this is often hydrolyzed by the alkaline material present in the solution. This in no way detracts from the reaction, since the 3β-ol products are quite useful and, if desired, may be reesterified. Often reesterification assists in the purification of the product. When an ester is used, it is advisable to employ somewhat in excess of a molar quantity of the alkaline agent so that some is left uncombined with the acid from hydrolysis of the ester group.

The following examples are given by way of illustration and are not intended as limitations of this invention. Indeed, as many apparently widely different embodiments of the present invention may be made without departing from the spirit and scope hereof, it is to be understood that the invention is only limited as defined in the appended claims.

EXAMPLE I

*Preparation of ergosta-8,22-diene-11-one-3β-ol acetate*

A solution of 0.508 gram of ergosta-8,14,22-triene-11-one-3β-ol acetate in 30 milliliters of absolute ethanol was mixed with 0.245 gram of potassium hydroxide. The mixture was then treated with 0.500 gram of pre-reduced W-7 Raney nickel catalyst and shaken under a pressure of one atmosphere of hydrogen and at a temperature of about 25° C. Within 25 minutes, approximately 105% of one molar quantity of hydrogen had been absorbed. The hydrogen absorption came practically to a standstill. The catalyst was filtered. The solution was neutralized with acetic acid and the solution was concentrated under vacuum. The residue was extracted with diethyl ether and concentration of the solution yielded 0.461 gram of ergosta-8,22-diene-11-one-3β-ol. During the reduction the acetate group at the 3-position had been hydrolyzed. This, of course, in no way interferes with the course of the reaction nor with the value of the product. The 3β-ol group was acetylated by means of a mixture of 5 milliliters of pyridine and 10 milliliters of acetic anhydride. From the reaction mixture there was isolated 0.42 gram of the acetate. This product was recrystallized from methanol and a 49% yield of the pure product was obtained. It melted at 131.0° C. to 132.2° C. A mixed melting point with an authentic sample of the same product prepared by a different method showed no depression.

EXAMPLE II

*Preparation of ergosta-8,22-diene-11-one-3β-ol*

A solution of 0.200 gram of ergosta-6,8,14,22-tetraene-11-one-3β-ol acetate in 15 milliliters of absolute ethanol containing 0.200 gram of prereduced W-7 Raney nickel catalyst and 0.150 gram of potassium hydroxide was shaken under one atmosphere pressure of hydrogen at room temperature. The solution absorbed approximately 85% of two molar quantities of hydrogen over a period of 50 minutes. The catalyst was removed by filtration. The mixture was neutralized with acetic acid and concentrated under vacuum to dryness. The residue was extracted with ether and the product was obtained on concentrating the ether solution.

When the starting materials of Example I and Example II above were reduced without the addition of potassium hydroxide and the reduction was stopped before hydrogen uptake had slowed down, only a very small yield of the desired product could be obtained. When these reactions were allowed to continue until hydrogen uptake had ceased, ergosta-8-ene-11-one-3β-ol was obtained.

What is claimed is:

1. A process for the selective reduction of the 14,15-double bond of a nuclear unsaturated steroid compound of the 22-ergostene series which comprises contacting said steroid compound with hydrogen in the presence of W-7 Raney nickel and an alkaline material.

2. A process according to claim 1 wherein the alkaline material is an alkali metal hydroxide.

3. A process for the selective reduction of the 14,15-double bond of a nuclear unsaturated steroid compound of the 22-ergostene series which comprises contacting an inert organic solvent solution of said steroid with hydrogen in the presence of an alkali metal hydroxide and of W-7 Raney nickel.

4. A process according to claim 3 wherein the steroid is chosen from the group consisting of ergosta-8,14,22-triene-11-one-3β-ol and the 3-alkyl esters thereof.

5. A process according to claim 3 wherein the steroid is chosen from the group consisting of ergosta-6,8,14,22-tetraene-11-one-3β-ol and the 3-alkyl esters thereof.

References Cited in the file of this patent

J. Am. Chem. Soc., vol. 70, pp. 695–98 (1948).
Fieser and Fieser, Natural Products Related to Phenanthrene, pp. 243, 244, 408–410 (1949).